United States Patent
Buckler

(10) Patent No.: US 8,614,735 B2
(45) Date of Patent: *Dec. 24, 2013

(54) VIDEO CONFERENCING

(71) Applicant: Mark Buckler, Wenham, MA (US)

(72) Inventor: Mark Buckler, Wenham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/649,751

(22) Filed: Oct. 11, 2012

(65) Prior Publication Data

US 2013/0088565 A1  Apr. 11, 2013

Related U.S. Application Data

(63) Continuation of application No. 11/966,674, filed on Dec. 28, 2007, now Pat. No. 8,289,363.

(60) Provisional application No. 60/877,288, filed on Dec. 28, 2006.

(51) Int. Cl.
*H04N 7/14* (2006.01)

(52) U.S. Cl.
USPC ..................... 348/14.08; 348/14.09

(58) Field of Classification Search
USPC .......... 348/14.01–14.12; 379/201.01, 202.01; 370/260–271

See application file for complete search history.

(56) References Cited

U.S. PATENT DOCUMENTS

| | | | |
|---|---|---|---|
| 5,778,082 A | 7/1998 | Chu et al. | 381/92 |
| 6,185,152 B1 | 2/2001 | Shen | 367/118 |
| 6,795,106 B1 * | 9/2004 | Cooper | 348/14.08 |
| 6,888,935 B1 * | 5/2005 | Day | 379/202.01 |
| 7,146,014 B2 | 12/2006 | Hannah | 381/92 |
| 2003/0220971 A1 * | 11/2003 | Kressin | 709/204 |

* cited by examiner

*Primary Examiner* — Brian Ensey
(74) *Attorney, Agent, or Firm* — Fish & Richardson P.C.

(57) ABSTRACT

A video conferencing system is provided, in which at least two cameras are used to capture images of people at a first location participating in a video conference. One or more active speakers are identified among the people at the location, and one of the at least two cameras is automatically selected based on a position or positions of the one or more active speakers. Images from the selected camera are provided to a person at a second location participating the video conference.

74 Claims, 18 Drawing Sheets

| Step 1 | $xDimension = \dfrac{1024}{Length}$ | $yDimension = \dfrac{768}{Height}$ |
|---|---|---|
| Step 2 | $xPos = \dfrac{xDimension - 1024}{-2.0}$ | $yPos = \dfrac{yDimension - 768}{-2.0}$ |
| Step 3 | $xPos = (HorizOffset - .5) \cdot xDimension$ | $yPos = (VertOffset - .5) \cdot yDimension$ |

VIDEO CONFERENCING

RELATED APPLICATIONS

This application is a continuation of and claims the benefit of U.S. patent application Ser. No. 11/966,674, filed on Dec. 28, 2007, which claims priority to U.S. Provisional Patent Application No. 60/877,288, filed on Dec. 28, 2006. The above applications are incorporated by reference in their entirety.

BACKGROUND

This invention relates to video conferencing.

Video conferencing allows groups of people separated by large distances to have conferences and meetings. In some examples, two parties of a video conference each uses a video conferencing system that includes a camera for capturing images of local participants and a display for showing images of remote participants (and optionally the local participants) of the video conference. The participants may manually control the cameras to adjust zoom and viewing angle in order to clearly show the faces of the speakers during the conference. In some examples, a video conferencing system may include an array of microphones to detect sound sources using triangulation, and automatically direct the camera to zoom in on the speaker.

SUMMARY

In one aspect, in general, a method of conducting a video conference is provided, in which at least two cameras are used to capture images of people at a first location participating in a video conference; one or more active speakers are identified among the people at the location; one of the at least two cameras is automatically selected based on a position or positions of the one or more active speakers; and images from the selected camera are provided to a person at a second location participating the video conference.

Implementations may include one or more of the following features. The images are optically or digitally zoomed based on the one or more active speakers. Identifying one or more active speakers includes identifying people who have spoken within a predetermined period of time. A database of one or more active speakers is maintained, adding a person who starts to speak to the database, and removing a person who has not spoken for a predetermined period of time from the database. A user interface is provided to allow adjustment of the duration of the predetermined period of time.

In another aspect, in general, at least two cameras are used to capture images of people at a location; one or more active speakers at the location are identified; one of at least two cameras are automatically selected based on a position or positions of the one or more active speakers; and images from the selected camera are provided.

Implementations may include one or more of the following features. Identifying one or more active speakers includes identifying people who have spoken within a predetermined period of time. A database of one or more active speakers is maintained, a person who starts to speak is added to the database, and a person who has not spoken for a predetermined period of time is removed from the database. The database is periodically updated and the selection of camera is automatically adjusted based on the updated database. Maintaining the database of one or more active speakers includes storing information about when each speaker starts and ends speaking. Maintaining the database of one or more active speakers includes storing information about a coordinate of each active speaker.

Selecting one of at least two cameras includes selecting one of the cameras having a smallest view offset angle with respect to the one or more active speakers. The images are sent to a remote party who is conducting a video conference with the people at the location. The position or positions of the one or more active speakers are determined. Determining positions of the active speakers includes determining positions of the active speakers by triangulation. Determining positions of the active speakers by triangulation includes triangulation based on signals from a microphone array. The camera is automatically zoomed to more clearly show the one or more active speakers. A zoom value is determined based on a distance or distances between the camera and the one or more active speakers. Determining the zoom value includes determining a zoom value to provide a first margin between a reference point of a left-most active speaker and a left border of the image, and a second margin between a reference point of a right-most active speaker and a right border of the image. A zoom value is determined based on a distance between the camera and a closest of the one or more active speakers. A viewing angle of the camera is automatically adjusted to more clearly show the one or more active speakers.

In another aspect, in general, a log of one or more active speakers at a location is maintained; a zoom factor and a viewing direction of a camera are automatically determined based on a position or positions of the one or more active speakers such that the active speakers are within a viewing range of the camera; and images of the one or more active speakers are provided.

Implementations may include one or more of the following features. The one or more active speakers are periodically identified and the log is updated to include the identified one or more active speakers. Updating the log includes adding a person who starts to speak to the log and removing a person who has not spoken for a predetermined period of time from the log. Determining the zoom factor and viewing direction of the camera includes determining a zoom factor and viewing direction to provide a first margin between a reference point of a left-most active speaker and left borders of the images, and a second margin between a reference point of a right-most active speaker and right borders of the images.

In another aspect, in general, active speakers in a room are identified, the room having cameras for capturing images of people in the room; a subset of less than all of the cameras in the room is selected; and images from the selected subset of cameras are provided to show the active speakers. Identifying active speakers includes identifying people in the room who have spoken within a predetermined period of time.

In another aspect, in general, a video conferencing system is provided. At least two cameras capture images of people at a first location participating a video conference; a speaker identifier identifies one or more active speakers at the first location; a data processor selects one of the at least two cameras based on a position or positions of the one or more active speakers and provides images from the selected camera to show the one or more active speakers; and a communication interface sends the images to a person at a second location participating the video conference.

Implementations may include one or more of the following features. A microphone array identifies speakers in the room based on triangulation. A storage stores information about speakers who have spoken within a predetermined period of time.

In another aspect, in general, at least two cameras capture images of people at a location; and a data processor selects one of the at least two cameras based on a position or positions of one or more active speakers at the location and provide images from the selected camera to show the one or more active speakers.

Implementations may include one or more of the following features. A speaker identifier identifies active speakers in the room. The speaker identifier identifies active speakers in the room by identifying one or more people who have spoken within a predetermined period of time. The speaker identifier includes a microphone array that enables determination of positions of the active speakers by triangulation. A storage stores coordinates of the active speakers in the room, and time points when each active speaker started and ended talking. The data processor selects one of the at least two cameras by selecting the camera having a smallest view offset angle with respect to the active speakers. The data processor executes a video conferencing process to send the image to a remote party who is video conferencing with the people at the location. The data processor controls a zoom factor and a viewing direction of the camera such that the active speakers are within a viewing range of the camera.

In another aspect, in general, at least two cameras capture images of people in a room; a speaker identifier identifies active speakers in the room; and a data processor selects a subset of the at least two cameras and provide at least one image from the subset of the at least two cameras to show the active speakers.

These and other aspects and features, and combinations of them, may be expressed as methods, apparatus, systems, means for performing functions, computer program products, and in other ways.

The apparatuses and methods can have one or more of the following advantages. Interpersonal dynamics can be displayed with the video conferencing system. By using multiple cameras, the viewing angle of the people speaking can be improved, when there are several participants in the video conference, most or all of the speakers do not have to turn their heads significantly in order to face one of the cameras. The system can automatically choose a camera and its viewing direction and zoom factor based on the person or persons speaking so that if there are two or more people conducting a conversation, images of the two or more people can all be captured by the camera. Effectiveness of video conferences can be increased. Use of digital zooming can reduce mechanical complexity and reduce the response delay caused by motion controllers.

Other features and advantages of the invention are apparent from the following description, and from the claims.

DESCRIPTION

Figure 1A:
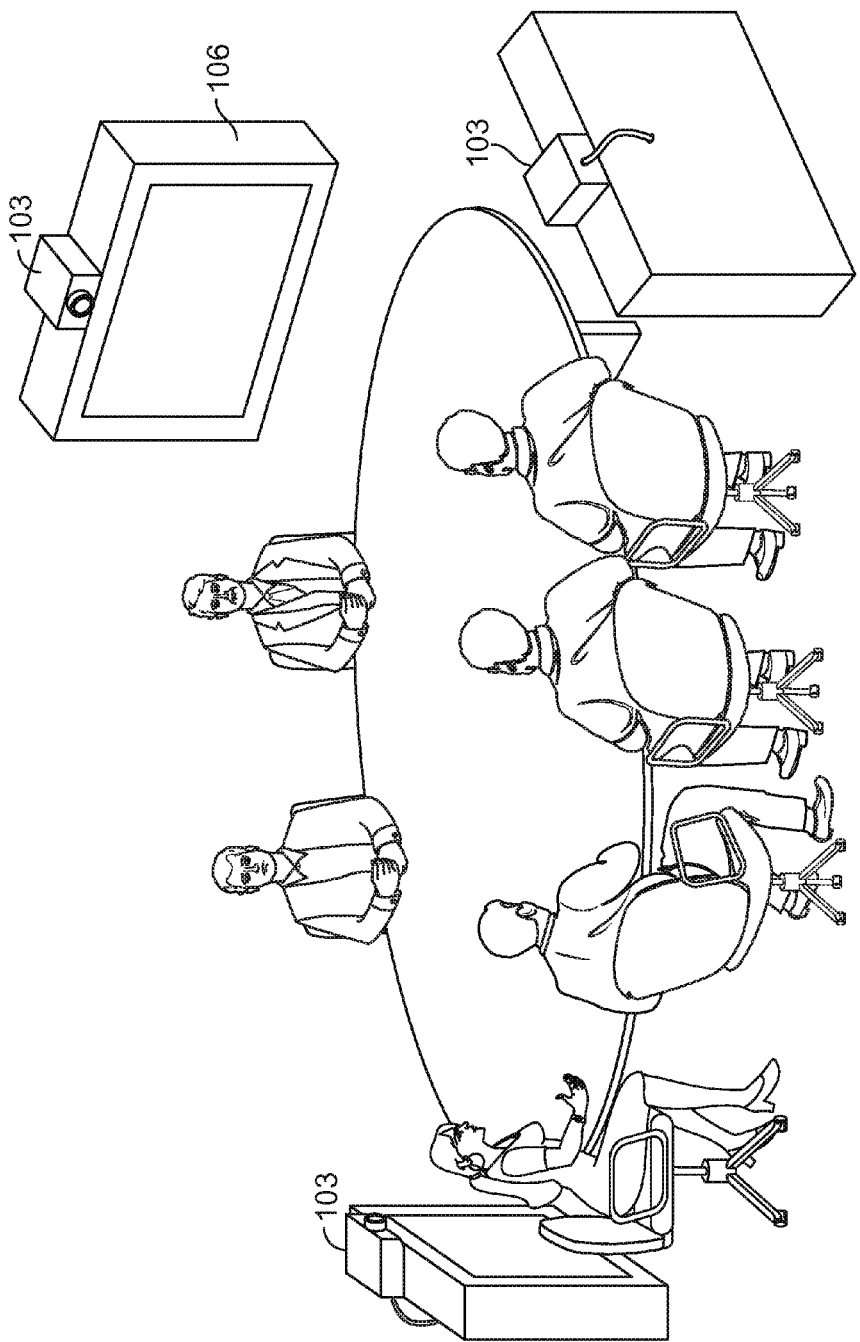
FIG. 1A is a diagram of an environment in which a conversation sensitive video conferencing system can be used.

Referring to FIG. 1A, an example of a conversation sensitive video conferencing system includes multiple video cameras 103 to capture a video or images of participants of a video conference from various viewing angles. The video conferencing system automatically selects one of the cameras 103 to capture images of people who have spoken within a predetermined period of time. When two or more people are in a conversation or discussion, the viewing direction and zoom factor of the selected camera are automatically adjusted so that images captured by the selected camera show most or all of the people actively participating in the conversation. When additional people join in the conversation, or when some people drop out of the conversation, the choice of camera and the viewing direction and zoom factor of the selected camera are automatically re-adjusted so that images captured by the selected camera show most or all of the people currently participating in the conversation.

An advantage of the conversation sensitive video conferencing system is that remote participants of the video conference can see more clearly the people who are actively participating in the conversation. If only one camera were used, it may be difficult to provide a good viewing angle for all or most of the participants. Some participants may have their backs toward the camera and would have to turn their heads significantly in order to face the camera. If the viewing angle and zoom factor of the camera were fixed during the conference so that the camera capture images showing all of the people in the conference room, the faces of some of the people may be small, and it may be difficult for the remote participants to see clearly the people who are speaking.

Another advantage of the conversation sensitive video conferencing system is that it is not necessary to manually select one of the cameras or adjust the viewing angle and zoom factor to capture images of people actively participating in the conversation. Participants of the video conference can focus on the discussion, rather than being distracted by the need for constant adjustment of the cameras.

Each of the video cameras 103 is capable of capturing a video that includes a sequence of images. In this description, the images captured by the camera can be either still images or a sequence of images that form a video.

Figure 1B:
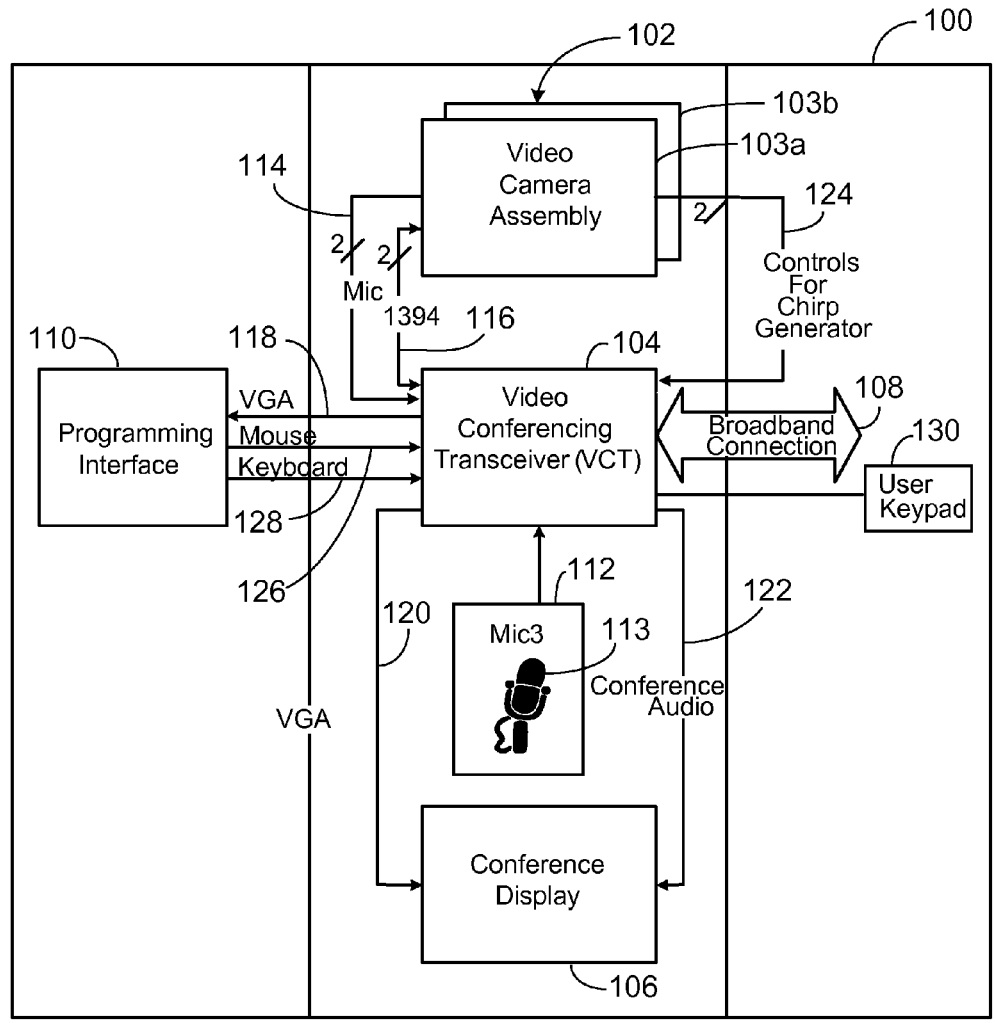
FIG. 1B is a diagram of a conversation sensitive video conferencing system.

Referring to FIG. 1B, an example of a conversation sensitive video conferencing system 100 can be used to show interpersonal dynamics among local participants of a video conference. The system 100 includes a camera assembly 102 having multiple cameras (e.g., 103a and 103b, collectively referenced as 103) that capture images of the people participating in the video conference from various viewing angles. A video conferencing transceiver (VCT) 104 controls the camera assembly 102 to select one of the cameras to capture images of people who have spoken within a predetermined period of time. When two or more people are actively participating in a discussion, the video conferencing transceiver 104 automatically adjusts the viewing direction and zoom factor of the selected camera so that images captured by the selected camera show most or all of the people actively participating in the discussion. This is better than displaying images showing all participants of the video conference (where each participant's face may be small and not clearly visible) or displaying images of individual speakers where the images switch from one speaker to another.

A conference display 106 is provided so that local participants of the video conference can see the images are captured by the selected camera 103, as well as images of the remote participants of the video conference. The video conferencing transceiver 104 is connected to the remote site through, for example, a broadband connection 108. A user keypad 130 is provided to allow local participants of the vide conference to control the video conferencing transceiver 104 to various system settings and parameters.

In some implementations, the system 100 includes a programming interface to allow configurations of the video conferencing transceiver 104 to be updated using, for example, a personal computer. A speaker location detector 112 determines the locations of speakers. The speaker location detector 112 may include, for example, an array of microphones 113 to detect utterances from a speaker and determine the location of the speaker based on triangulation.

The camera assembly 102 sends audio signals picked up by the microphones 113 to the video conferencing transceiver 104 through signal lines 114. The camera assembly 102 sends video signals to the video conferencing transceiver 104 through signal lines 116, which can be, e.g., IEEE 1394 cables. The signal lines 116 also transmit control signals from the video conferencing transceiver 104 to the camera assembly 102. The camera assembly 102 sends control signals for generating chirp signals for use in self-calibration to the video conferencing transceiver 104 through signal lines 124. The video conferencing transceiver 104 transmits VGA signals 118 to the programming interface 110, and receives mouse data 126 and keyboard data 128 from the programming interface 110. The video conferencing transceiver 104 sends video signals and audio signals to the conference display 106 through a VGA cable 120 and an audio cable 122, respectively.

Figure 2:
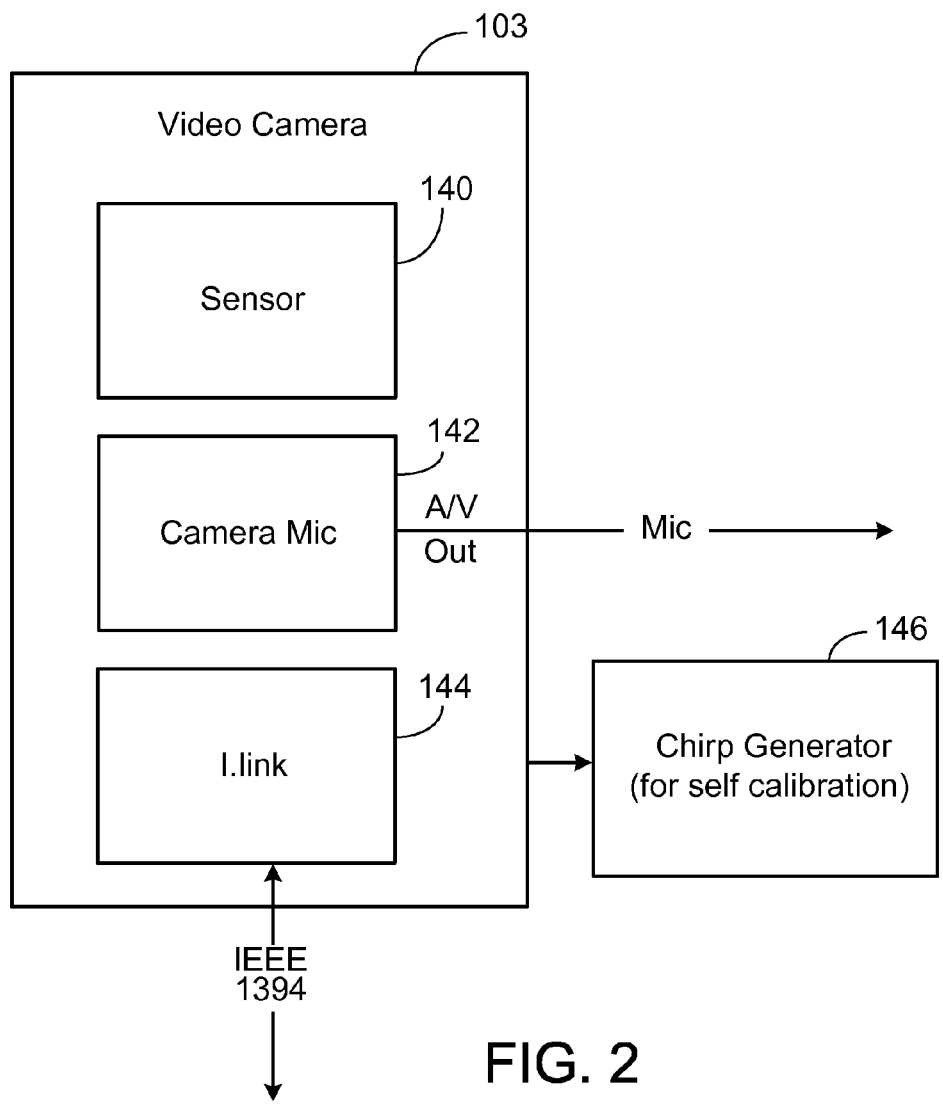
FIG. 2 is a block diagram of a video camera.

Referring to FIG. 2, in some implementations, each video camera 103 in the video camera assembly 102 includes a sensor 140 for capturing images, a camera microphone 142 for capturing audio signals, and an input/output interface 144 (e.g., an IEEE 1394 interface) for interfacing with the video conferencing transceiver 104. The sensor 140 can be, e.g., a charge coupled device (CCD) sensor or a complimentary metal oxide semiconductor (CMOS) sensor. The video camera 103 is coupled to a chirp generator 146 that is used to generate chirp signals for use in self calibrating the system 100.

Figure 3:
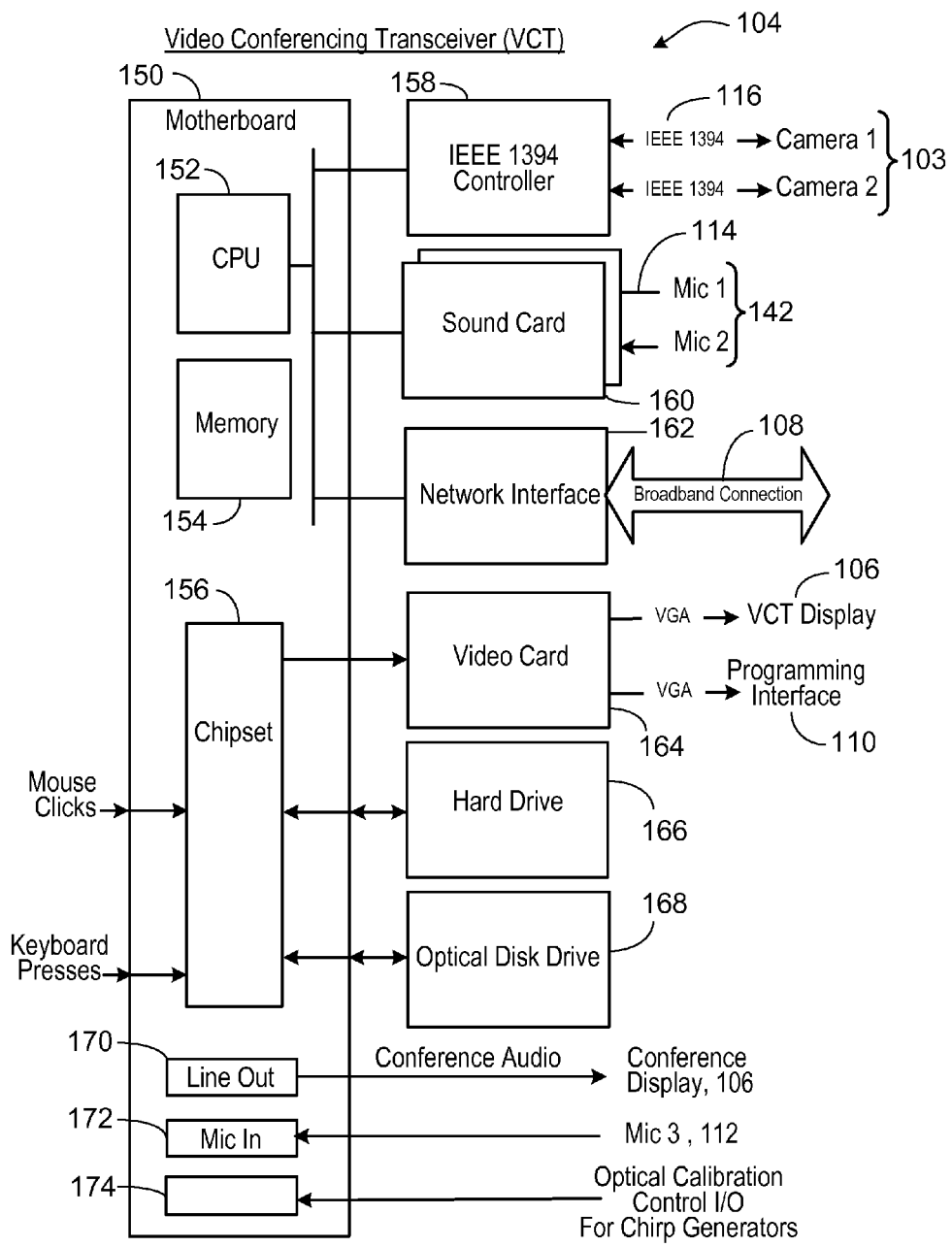
FIG. 3 is a block diagram of a video conferencing transceiver.

Referring to FIG. 3, in some implementations, the video conferencing transceiver 104 includes a motherboard 150 hosting a central processing unit (CPU) 152, memory devices 154, and a chipset 156 that controls various input/output devices and storage devices. The CPU 152 can be any type of microprocessor or microcontroller. The memory devices 154 can be, for example, dynamic random access memory (DRAM), Flash memory, or other types of memory. The motherboard 150 includes a line out port 170 for outputting conference audio signals to the conference display 106. A microphone input port 172 is provided to receive audio signals from the microphones 113 of the speaker location detector 112.

An IEEE 1394 controller 158 is provided to process signals sent through the IEEE 1394 bus 116. Sound cards 160 are provided to process audio signals from the video camera microphones 142. A network interface 162 is provided to connect to the broadband connection 108. A video card 164 is provided to generate video signals that are sent to the video conferencing display 106 and to the programming interface 110. A hard drive 166 and an optical disc drive 168 provide mass storage capability. For example, the hard drive 166 can store software programs used to control the system 100 and data generated when running the system 100.

Optionally, the motherboard 150 includes circuitry 174 for processing calibration control signals for chirp generators.

Figure 4:
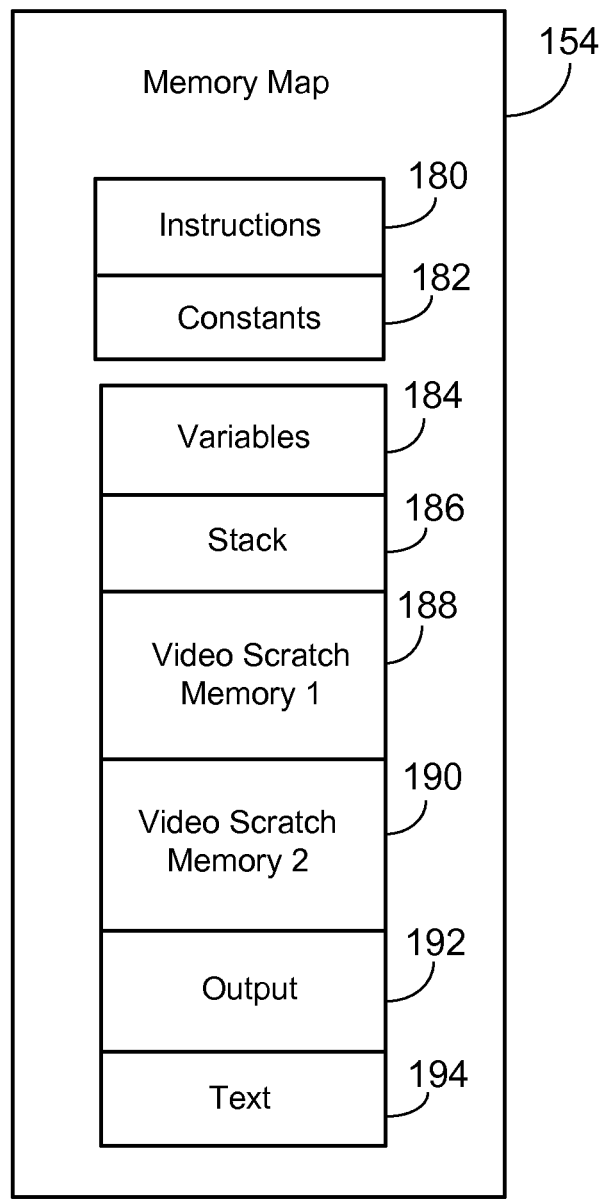
FIG. 4 is a diagram of a memory map.

Referring to FIG. 4, in some implementations, the memory devices 154 store various information, including programming instructions 180 for controlling the system 100 and constant values 182 that are used by the programming instructions 180. The memory devices 154 store variable values 184 and stacks of data 186 that are generated and used during operation of the system 100. The memory 154 includes a region for storing output data 192, and a region for storing text 194 to be displayed on the conference display 106.

A first video scratch memory 188 is provided to store image data from a first video camera 103a, and a second video scratch memory 190 is provided to store image data from a second video camera 103b. If more video cameras 102 are used, additional scratch memory can be provided for each video camera 103. Each video scratch memory corresponds to a window showing images captured by a corresponding video camera 103. The camera 103 that is chosen has its window moved to the front of the display screen, and the camera 103 not chosen has its window sent to the back of the display screen. By switching between the video scratch memory 188 and 190, the system 100 can quickly switch from images from one video camera 103a to images from another video camera 103b.

Figure 5:
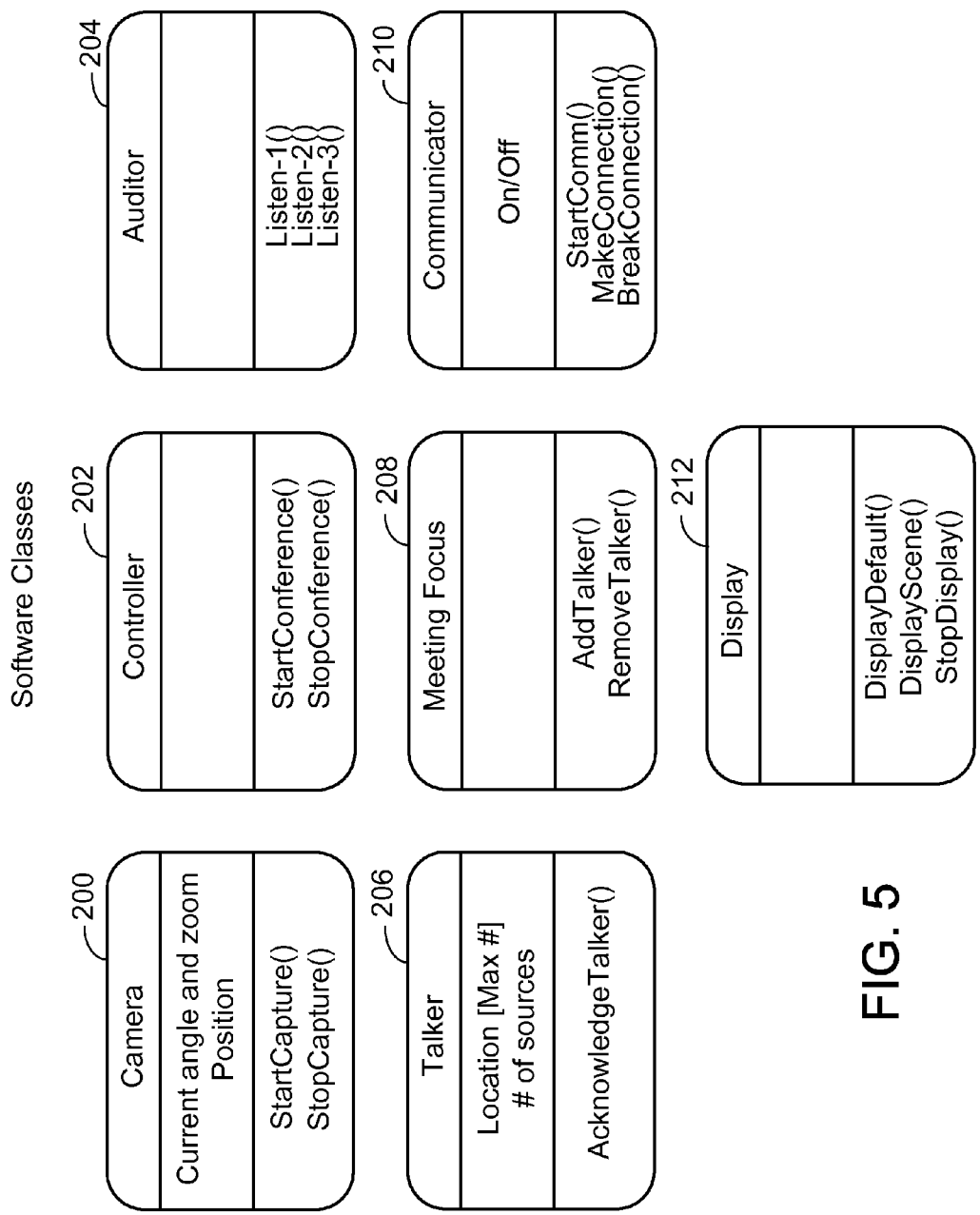
FIG. 5 shows software classes for implementing a conversation sensitive video conferencing system.

Referring to FIG. 5, in some implementations, the conversation sensitive video conferencing system 100 executes software programs written in object oriented programming, in which various software classes are defined. For example, a Camera class 200, a Controller class 202, an Auditor class 204, a Talker class 206, a Meeting Focus class 208, a Communicator class 210, and a Display class 212 are defined. In this description, the same reference number is used for a class and objects that belong to the class. For example, the reference number 200 is used for both the Camera class and a Camera object belonging to the Camera class.

A Camera object 200, which is an instance of the Camera class 200, can be used for controlling various aspects of one of the cameras 103. The Camera object 200 can call LibDC 1394 functions to control the video camera 103 to capture video. The LibDC1394 is a library that provides a high level programming interface for controlling IEEE 1394 based cameras that conform to the 1394-based Digital Camera Specifications. The library allows control of the camera, including turning the camera on or off, and have continuous live feed. The Camera object 200 can also call Java media framework (JMF) application programming interface (API).

For example, the Camera object 200 can have methods (or interfaces) such as StartCapture( ) and StopCapture( ), which can be used for starting or stopping the recording of video data.

The Camera object 200 has a number of parameters that can be adjusted, such as current angle and zoom factor. Adjusting the current angle and zoom factor of the Camera object 200 causes the current angle and zoom factor of the corresponding camera 103 to be adjusted.

When the video conferencing system 100 is turned on, a Controller object 202 (which is an instance of the Controller class 202) starts up a user interface to allow the user to control the video conferencing system.

For example, the Controller object 202 can have two methods, including StartConference( ) and StopConference( ) methods, which can be used to start or stop the system 100 when either a local user or a remote user initializes or ends a conference.

An Auditor object 204 (which is an instance of the Auditor class 204) can be used to monitor audio signals. For example, there can be three Auditors 204 each representing one of the microphones 113. If the speaker position detector 112 includes more than three microphones 113, an additional Auditor object 204 can be provided for each additional microphone 113.

The Auditor object 204 can have a Listen( ) method for reading audio data from a circular buffer and determining whether the audio data represents background noise or speaker utterance. When a speaker utterance is detected, referred to as an "onset", the Auditor object 204 informs a Talker object 206 (described below), which then correlates the signals from the three Auditor objects 204 to determine the position of the speaker.

The Talker object 206 (which is an instance of the Talker class 206) can receive information provided by the Auditor objects 204 and can have a AcknowledgeTalker( ) method that is used to calculate the location of the sound source (e.g., location of the speaker) using correlation and triangulation. The Talker object 206 also checks to see if the speaker stops speaking, as this information is useful to a conversation sensing algorithm in determining which persons are still participating in a conversation.

A Meeting Focus object 208 (which is an instance of the Meeting Focus class 208) implements a conversation sensing algorithm that determines which persons (referred to as speakers or talkers) are participating in a conversation, and constructs a talker map 350 (FIG. 10B) that includes information about the speakers, the locations of the speakers, and the start and end times of talk for each speaker. For example, the talker map 350 can be implemented as a database or a table.

For example, the Meeting Focus object 208 can have two methods, including AddTalker( ) and RemoveTalker( ) methods that are used to add or remove speakers from the talker map.

The Meeting Focus object 208 determines the best view of the speaker(s), taking into account variables such as the camera resolution, dimensions of the window showing the images of the speakers, percentage of entire screen being occupied by the images, and centroid of images, etc. The Meeting Focus object 208 sends this information to a Display object 212 (described below).

A Communicator object 210 (which is an instance of the Communicator class 210) controls the communications infrastructure of the system 100. If a connection with a remote party is made or broken, the Communicator object 210 informs the Controller object 202.

For example, the Communicator object 210 can have three methods, including StartComm( ) method for initiating the communication interfaces, a MakeConnection( ) method for establishing a connection with a remote party, and a BreakConnection( ) method for ending the connection with the remote party.

In some implementations, a digital zoom is used. A Display object 212 (which is an instance of the Display class 212) calculates a zoom factor based on requested coordinates and the percentage of the screen that the images is to be displayed, which are provided by the Meeting Focus object 208.

For example, the Display object 212 can have three methods, including a DisplayDefault( ) method for displaying images using default parameters, a DisplayScene(0 method for display images that mainly show the active participants of a conversation, and a StopDisplay( ) method that stops display images that mainly show the active participants of a conversation.

Figure 6:
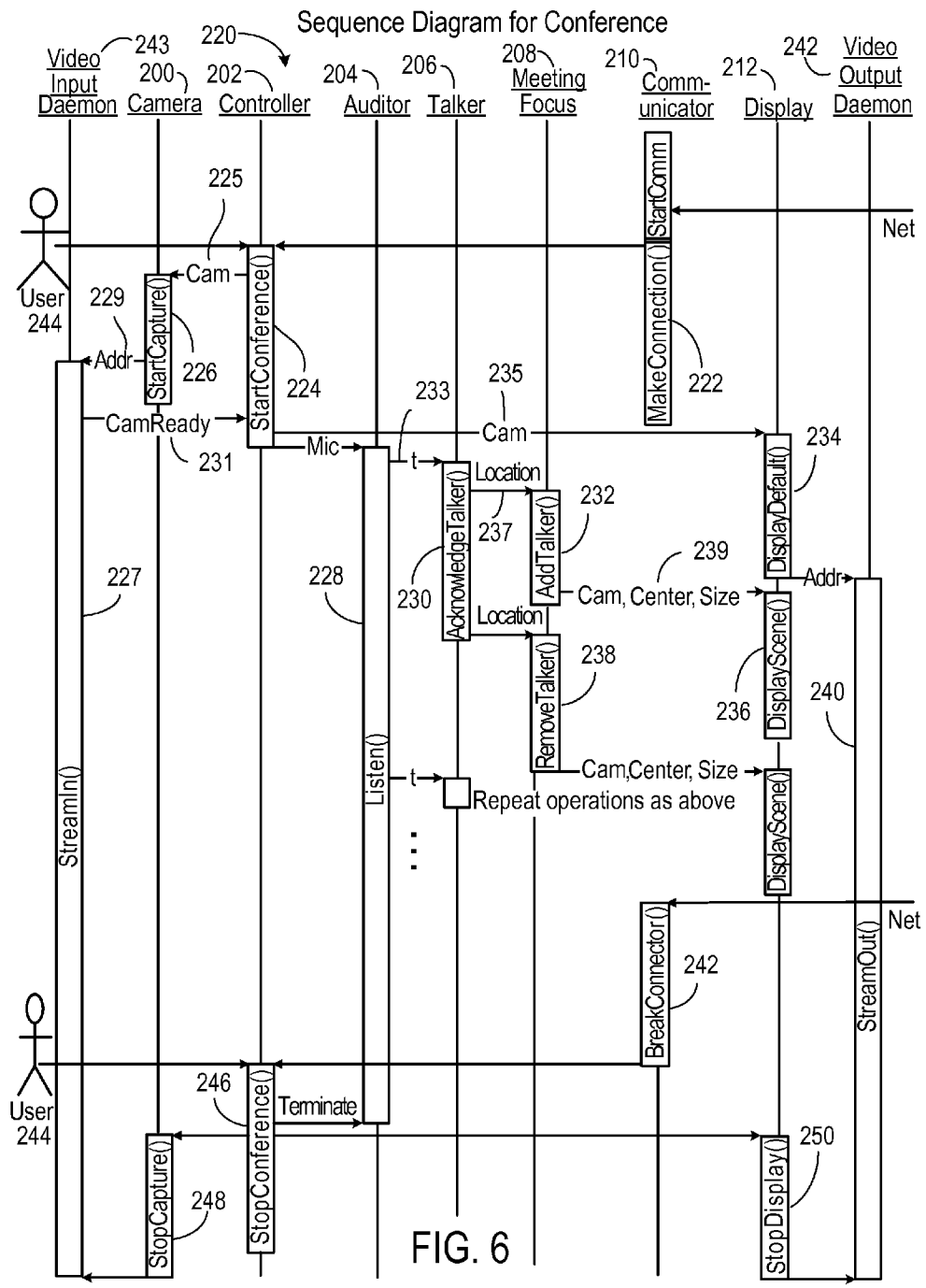
FIG. 6 is a diagram showing a sequence of events and interactions between objects when the conversation sensitive video conferencing system is used to conduct a video conference.

FIG. 6 is a sequence diagram 220 showing a sequence of events and interactions between objects when the conversation sensitive video conferencing system 100 is used to conduct a video conference. The system 100 is started by a Controller object 202, which initializes a user interface so that a meeting can be started by a local user 244. The Controller object 202 can be invoked by a local user 244, or by a remote user that makes an incoming call to invoke a MakeConnection( ) method 222 of the Communicator object 210.

The Controller 202 invokes a StartConference( ) method 224, which initiates a self-calibration process. The Controller 202 starts buzzers by making a call to the Camera objects 200. During the self-calibration process, the acoustics characteristics of the video conference room is analyzed and the locations of the cameras are determined. Upon the completion of the self-calibration process, the video conference can begin.

When the Controller 202 finishes self calibration, the Controller 202 invokes a StartCapture( ) method 226 of the Camera object 200 to initialize each of the video cameras 103. The Controller 202 passes a Cam parameter to the StartCapture( ) method 226 to indicate which camera 103 is to start capturing images. The Camera object 200 invokes a StreamIn( ) method 227 to start a video daemon 243 to enable video data to be written into the memory 154. The Camera object 200 passes an Addr parameter 229 to the StreamIn( ) method 227 to indicate the address of the memory 154 to which the video data is to be written. The video input daemon 243 sends a CamReady acknowledgement signal 231 to the Controller 202 when the camera 103 is ready to stream video data to the memory 154.

The Controller 202 invokes a DisplayDefault( ) method 234 of the Display object 212 to display images captured by the camera 103 using default display settings. The Controller 202 passes a Cam parameter 235 to the DisplayDefault( ) method 234 to indicate that the images from the camera 103 represented by the Cam parameter 235 is to be displayed.

The Display 212 invokes a StreamOut( ) method 240 to start a video output daemon 242 so that a video with default settings is shown on the conference display 106 and sent to the remote users of the video conference.

The Controller 200 invokes a Listen( ) method 228 of an Auditor object 204. When the Auditor 204 hears an onset, the Auditor 204 invokes an AcknowledgeTalker( ) method 230 of a Talker object 206 to calculate the location of the audio source (i.e., the location of a speaker who just started speaking) through trigonometry and calculus algorithms. The Auditor 204 passes a t parameter 233 to the AcknowledgeTalker( ) method 230 to indicate the time of onset.

The Talker 206 invokes an AddTalker( ) method 232 of a Meeting Focus object 208 to add the new speaker to the talker map. The Talker 206 passes a Location parameter 237 to the AddTalker( ) method 232 to indicate the location of the new speaker. The Meeting Focus 208 identifies the correct camera that can capture images that include the active speakers in the talker map. The Meeting Focus object 208 determines a center of the image and the size of the image to display.

The Meeting Focus object 208 invokes a DisplayScene( ) method 236 of the Display object 212, which determines how pixel values are interpolated in order to achieve a certain digital zoom. The Meeting Focus object 208 passes Cam, Center, and Size parameters 239 to the DisplayScene( ) method 236, where Cam represents the selected camera 103, Center represents the location of a center of the portion of image captured by the video camera 103 to be displayed, and Size represents a size of the portion of image to be displayed. The DisplayScene( ) method 236 causes an image to be shown on the conference display 106, in which the image has the proper zoom and is centered near the centroid of the active speakers.

When there are more than one speaker in the talker map, the Meeting Focus object 208 determines a centroid of the speaker locations and adjusts the image so that the centroid falls near the center of the image. The Meeting Focus object 208 also determines a zoom factor that affects the percentage of the screen that is occupied by the speaker(s). For example, if there is only one speaker, a zoom factor may be selected so that the speaker occupies 30% to 50% of the width of the image. When there are two speakers, a zoom factor may be selected so that the speakers occupy 50% to 70% of the width of the image, when there are three or more speakers, a zoom factor may be selected so that the speakers occupy 70% to 90% of the width of the image, etc. The percentage values above are examples only, other values may also be used.

The zoom factor that results in the speaker(s) occupying a particular percentage of the image can be determined based on a function of the distance(s) between the camera and the speaker(s). The zoom factor can also be looked up from a table that has different zoom factors for different camera-speaker distances and different percentage values (representing the percentage that the speakers occupy the image).

When the Talker 206 determines that a speaker has stopped talking for a predetermined period of time, the Talker 206 invokes a RemoveTalker( ) method 238 of the Meeting Focus object 208 to remove the speaker from the talker map. The Meeting Focus object 208 selects a camera that can capture images that include the remaining speakers in the talker map. The Meeting Focus object 208 determines the centroid of the speaker locations and the percentage of screen that is occupied by the remaining speakers. The Meeting Focus object 208 invokes the DisplayScene( ) method 236 to show images having the proper zoom and centered near the centroid of the remaining active speakers.

The Auditor 204 continues to listen to the signals from the microphones 113 of the speaker location detector 112. When the Auditor 204 hears an onset, the Auditor 204 invokes an AcknowledgeTalker( ) method 230, repeating the steps described above for adding a speaker to the talker map and later removing the speaker from the talker map when the speaker ceases speaking Whenever a speaker is added to or removed from the talker map, the selection of camera and the viewing direction and zoom factor of the selected camera are adjusted to properly show the current participants of the conversation or discussion.

The video conference can be ended by invoking a StopConference( ) method 246 of the Controller object 202. The StopConference( ) method 246 can be invoked by the local user 244 or by the remote party hanging up the call, which invokes a BreakConnnection( ) method 242 of the Communicator 210. When the StopConference( ) method 246 is invoked, the Controller 202 terminates the Listen( ) method 228 and invokes a StopCapture( ) method 248 of the Camera object 200 to cause the camera 103 to stop capturing images. The Controller 202 invokes a StopDisplay( ) method 250 of the Display object 212 to end the video output to the conference display 106.

The following is a description of the various methods of the objects used in the system 100.

The methods associated with the Camera object 200 include StartCapture( ) 226 and StopCapture( ) 248. The StartCapture( ) method 226 causes the sensor 140 of the camera 103 to start operating, and invokes a StreamIn(Addr) method that causes video data to be streamed into the memory 154 starting at address Addr.

The StopCapture( ) method 248 ends the StreamIn(Addr) method to end the streaming of video data to the memory 154.

The methods associated with the Controller object 202 include Main( ), StartConference( ) 224, and StopConference( ) 246 methods. The Main( ) method is used to set up a window for showing the video images of the video conference, invoke an InitializeDisplay( ) method to initialize the display 106, and wait for input from the user 244 or the communicator 210. If an input is received, the Main( ) method invokes the MakeConnection( ) method 222 to cause a connection to be established between the local participants and the remote participants.

The StartConference( ) method 224 can be initialized by either a local user or by the Communicator 210. StartConference( ) 224 invokes a StartCapture(n) method for each video camera n, and wait until a CamReady flag is received from each video camera n indicating that the video camera n is ready. The StartConference( ) method 224 invokes the DisplayDefault( ) method 234 to cause images from the video camera to be shown on the display 106. The StartConference( ) method 224 invokes the Listen(m) method 228 for each microphone m to listen to audio signals from the microphone m.

The StopConference( ) method 246 terminates the Listen (i) method 228 for each microphone i, invokes StopCapture(j) method 248 for each camera j, and invokes StopDisplay(k) method 250 to stop images from the camera k from being shown on the display 106.

The methods associated with the Auditor object 204 include the Listen( ) method 228. The Listen(mic) method 228 starts receiving audio data associated with the microphone mic through the audio card 160. The Listen( ) method 228 reads segments of the audio data based on a sliding time window from the memory 154 and determines whether the audio signal is noise or speech by checking for correlation. If the audio signal is not noise, the begin time t of the speech is determined. The Listen( ) method 228 then invokes the AcknowledgeTalker(t) method 230 to cause a new speaker to be added to the talker map.

The methods associated with the Talker object 206 include the AcknowledgeTalker(t) method 230.

Figure 7:
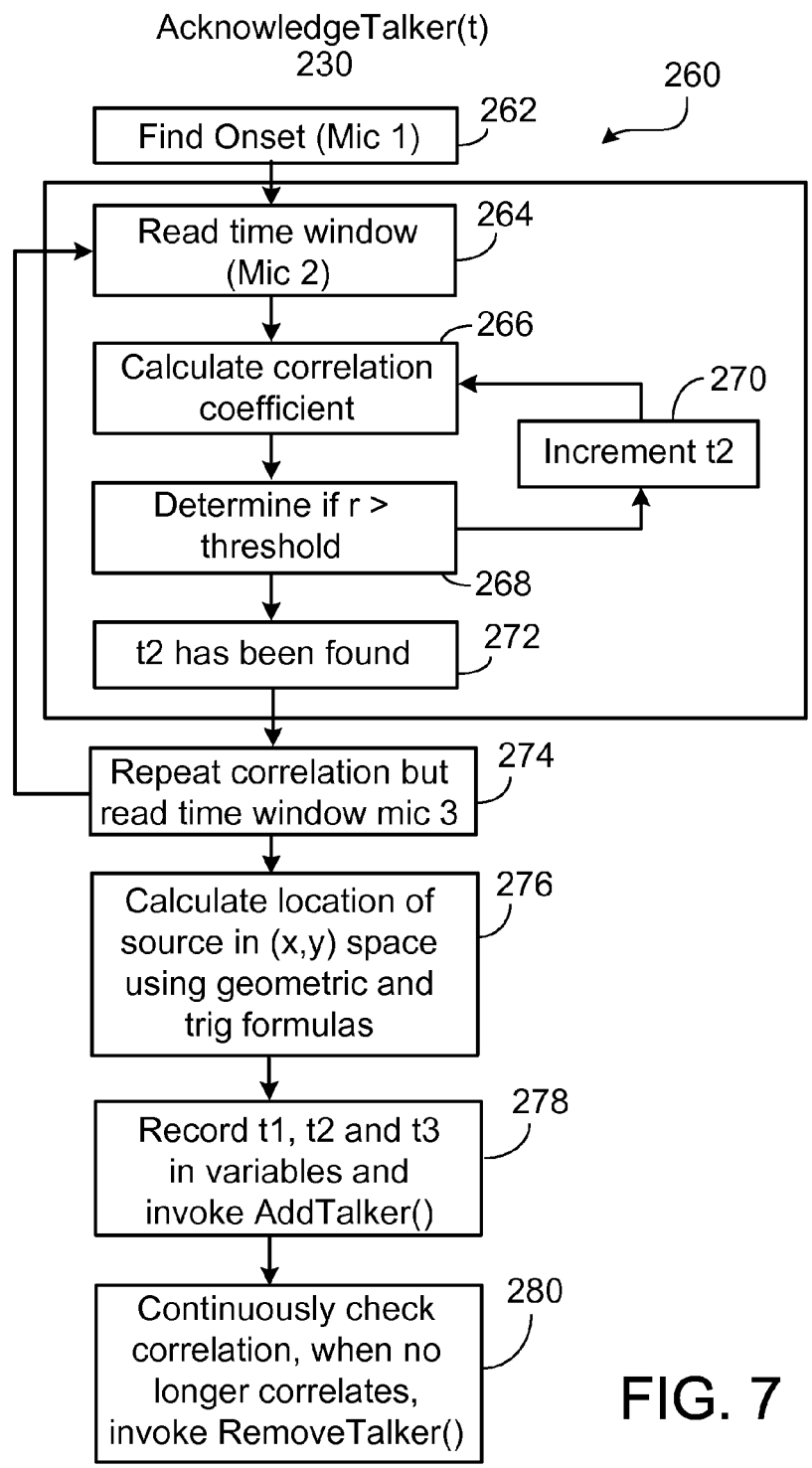
FIG. 7 is a flow diagram of a process implemented by an AcknowledgeTalker( ) method.

Referring to FIG. 7, the AcknowledgeTalker(t) method 230 implements a process 260 to determine the location of the audio source (e.g., location of the speaker). The AcknowledgeTalker( ) method 230 analyzes audio signals from different microphones 113 and determines whether there is a correlation between the audio signals from the different microphones 113. Because the distances between the speaker and the various microphones 113 may be different, the same audio signal may be picked up by different microphones 113 at different times. A time delay estimation technique can be used to determine the location of the speaker.

The process 260 finds the onset detected by the first microphone 113a (262) at time t1. To determine whether there is correlation between the audio signal from the first microphone 113a and the audio signal from the second microphone 113b, the process 260 reads a segment of the audio signal from a first microphone 113a starting at t1, and a segment of the audio signal from the second microphone 113b starting at t2 using a sliding time window, and calculates a correlation coefficient r of the two segments of audio signals (266). The sliding time window is adjusted, e.g., by incrementing t2 (270), until a correlation is found, in which the correlation coefficient r is greater than a threshold (268). For example, if an audio segment starting at t1 from the first microphone 113a correlates to an audio segment starting from time t2 from the second microphone 113b, the process 260 determines that the time t2 associated with the second microphone 113b has been found (272).

The process above is repeated to find the correlation between the audio signal from the first microphone 113a and the audio signal from the third microphone 113c (274). The location (x, y) of the audio source (i.e., the speaker) is determined using geometric and trigonometry formulas (276). The process 260 records time points t1, t2, and t3 in variables and invoke the AddTalker( ) method 232 to add the speaker to the talker map. The process 260 continuously check the correlations among the audio signals from the microphones 1, 2, and 3. When the audio signals no longer correlate to one another, the process 260 invokes the RemoveTalker( ) method 238 to remove the speaker from the talker map.

The methods associated with the Meeting Focus object 208 include the AddTalker(Location) method 232 and the RemoveTalker(Location) method 238.

Figure 8:
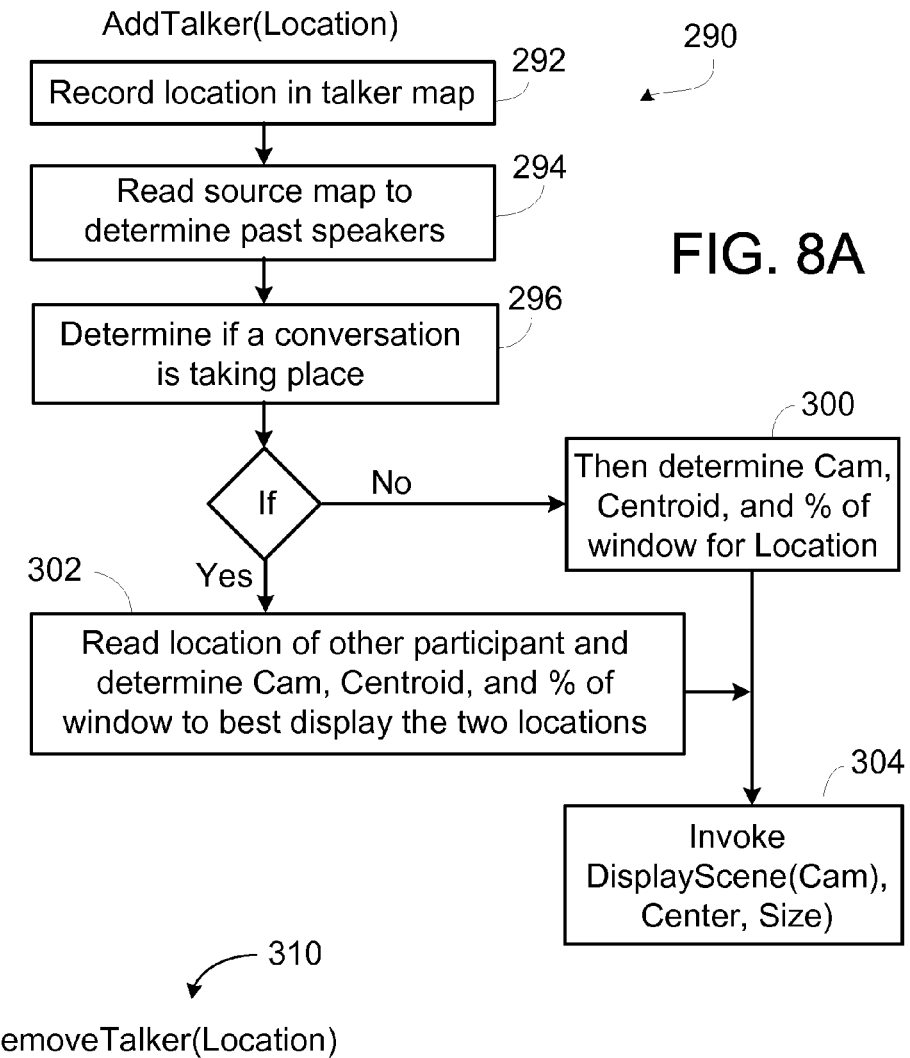
FIG. 8A is a flow diagram of a process implemented by an AddTalker( ) method.
FIG. 8B is a flow diagram of a process implemented by a RemoveTalker( ) method.

Referring to FIG. 8A, the AddTalker(Location) method 232 implements a process 290 to add a speaker to the talker map. The process 290 records the location of the speaker in the talker map (292). A source map 340 (FIG. 10A) is read to determine if there are other speakers (294). The source map 340 includes a log of all the people who have spoken. The talker map 350 includes a list of the people who are currently actively participating in a conversation. The process 290 determines if a conversation or discussion is taking place (296).

If there is only one active speaker, which indicates no conversation is taking place, the process 290 selects a camera 103 and determines the centroid and percentage of window to show the speaker at the location (300). If there are more than one active speaker, which indicates that a conversation is taking place, the process 290 reads the location(s) of the other participant(s), selects a camera 103, and determines the centroid and percentage of window to best show images that include the locations of all the active speakers (302). The process 290 invokes the DisplayScene(cam, center, size) method 236 to cause the image to be shown on the conference display 106 (304).

Referring to FIG. 8B, the RemoveTalker(location) method 238 implements a process 310 that includes re-selecting the camera 103 and recalculating the center and size of image based on the locations of the remaining active speakers (312). The process 310 updates the talker map (314) and invokes the DisplayScene( ) method 236 to cause an updated image to be shown on the conference display 106 (316).

The methods associated with the Communicator 210 include the MakeConnection( ) method 222 and the BreakConnection( ) method 242. The MakeConnection( ) method 222 checks to see if a connection is established with a remote site. If there is a connection, the MakeConnection( ) method 222 invokes the StartConference( ) method 224. If there is no connection, the MakeConnection( ) method 222 checks the connection again after a period of time.

The BreakConnection( ) method 242 invokes the StopConference( ) method 246 to cause the video conference to stop.

The methods associated with the Display 212 include the DisplayScene(Cam, (x,y), percentage of display) method 236 and the StopDisplay( ) method 250. The DisplayScene( ) method 236 reads data from memory that is written by the video input daemon 243. The DisplayScene( ) method 236 selects a camera, determines the dimensions of the digital zoom, and implements the calculated dimensions. A filter is used to smooth out the images to reduce block artifacts in the images.

The StopDisplay( ) method 250 ends the StreamOut(Addr) method 240 to stop the video output daemon 242 form streaming video to the memory 154.

Figure 9:
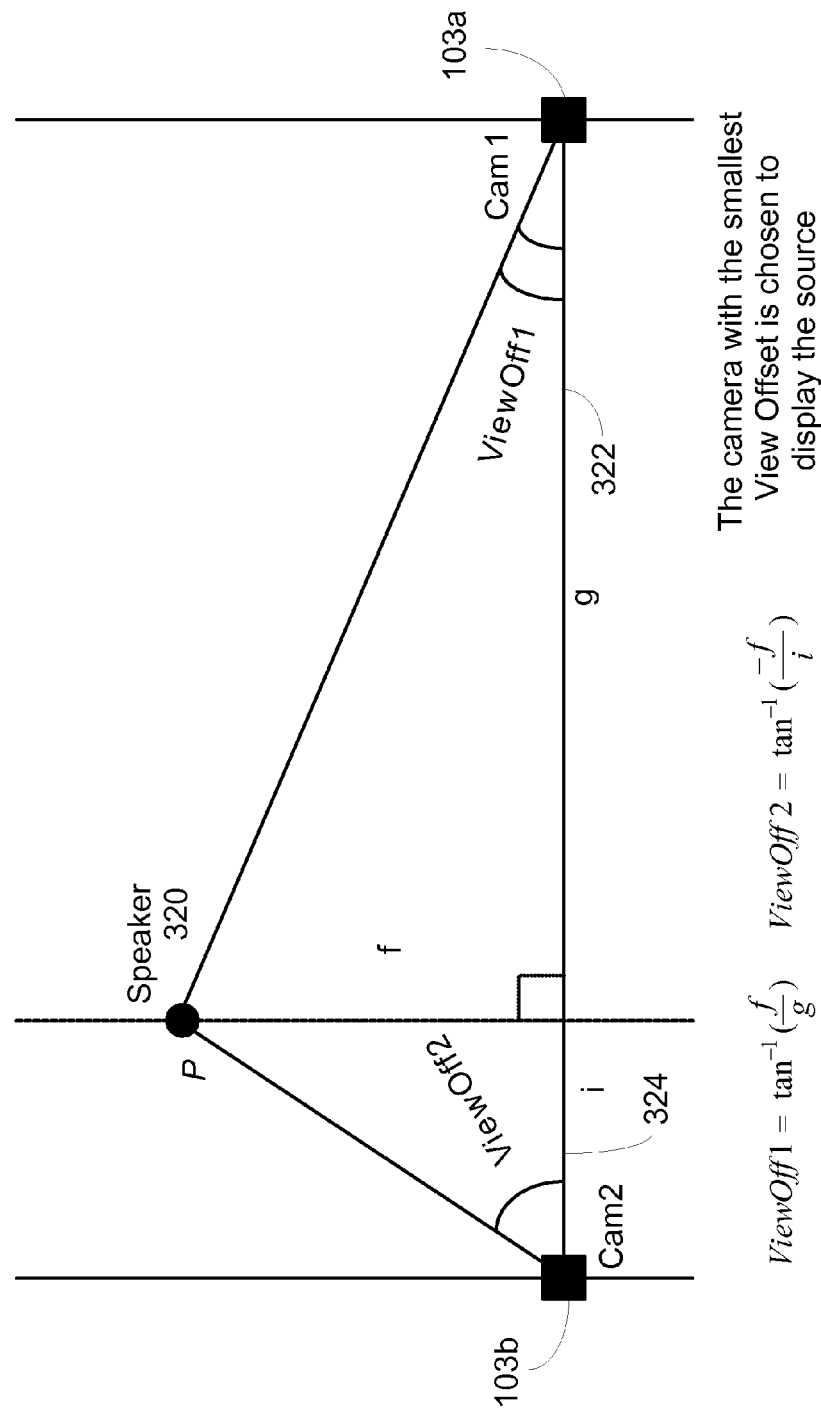
FIG. 9 is a diagram of relative positions of a speaker and cameras.

Referring to FIG. 9, in some implementations, the cameras 103 do not change viewing directions, and zooming and panning are achieved by digital cropping and enlargement of portions of the images. In this case, a camera 103 can be selected from among the plurality of cameras 103 in the camera assembly 102 by choosing the camera with the optimal viewing angle. In some implementations, the camera having the optimal viewing angle can be selected by finding the camera with the smallest view offset angle. In this case, the speaker will be closer to the center of the image captured by the camera.

In the example of FIG. 9, a first camera 103a and a second camera 103b are facing each other, so a viewing direction 322 of the first camera 103a aligns with a viewing direction 324 of the second camera 103b. The viewing directions of the cameras can be different. A speaker 320 at location P has a view offset angle ViewOff1 with respect to the view direction 322 of the first camera 103a and a view offset angle ViewOff2 with respect to the view direction 324 of the second camera 103a. In this example, because ViewOff1 is smaller than ViewOff2, the first camera 103a is selected as the camera 103 for capturing images of the speaker 320.

In some implementations, digital zooming is used in which images from the video camera 103 are cropped and enlarged to achieve a zoom effect. When there is a single speaker, the cropped image has the speaker at the center of the image. The size of the cropped image frame is adjusted (e.g., enlarged) to fit the correct zoom factor. For example, if the zoom factor is 2×, the cropped image frame has a width and length that is one-half of the original image, so that when the cropped image is enlarged by 2×, the enlarged image has the same size as the original image, thereby achieving digital zooming. The position of the cropped image is selected to accurately display the chosen person, e.g., so that the speaker is at the middle of the cropped image.

Figures 10A, 10B:
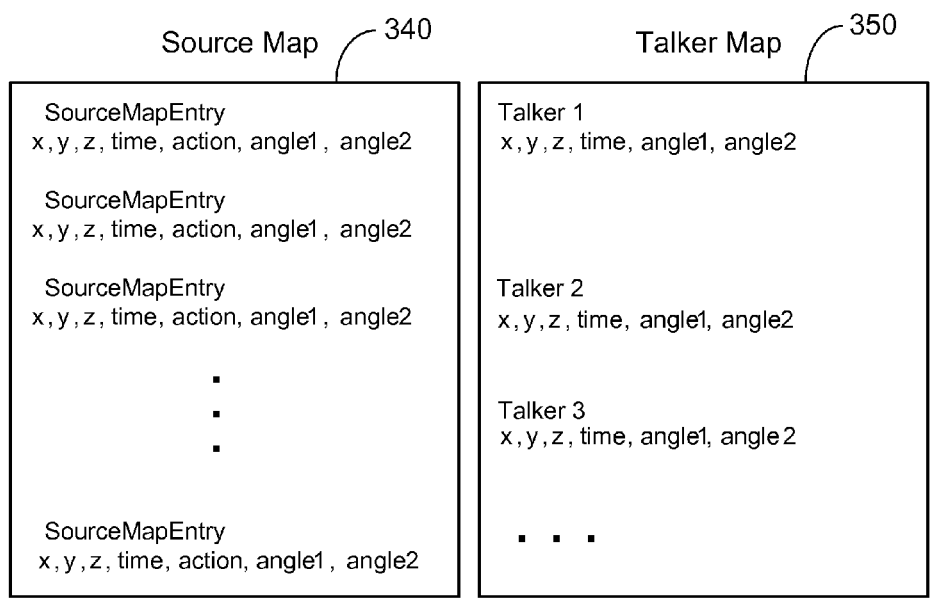
FIG. 10A is a diagram of a source map.
FIG. 10B is a diagram of a talker map.

Referring to FIG. 10A, a source map 340 is stored in the memory 154 to manage information about a continuous list of talkers. The source map 340 keeps track of past talkers and allows the Talker object 206 to determine the current active participants of a conversation so that the correct participants can be shown on the display 106 and to the remote participants. To establish the source map 340, a SourceMapEntry class is used. A SourceMapEntry object includes the (x, y) coordinates of the speaker's location and the times and that the speaker starts or stops talking.

The action, angle1, angle2, time, and (x,y) coordinates are components of the SourceMapEntry class. The action parameter can be "stop" or "start" (indicating whether the source has stopped or started talking) The angle n (n=1, 2, 3, . . . ) parameter represents the offset angle for the specific camera n to the talker (the angle that the optical axis of the camera n would need to turn to be pointing toward the talker). In this example, two cameras 103 were used, so there were two angle parameters for each SourceMapEntry. If more cameras 103 are used, more angle parameters can be used for the additional cameras.

Referring to FIG. 10B, a conversation recognition algorithm is used to determine the participants of an active conversation and to establish a talker map 350 including a list of the participants of an active conversation. There can be various conversational dynamics that could happen during a conference. For example, one person can be making a speech, two people can be talking to each other in a discussion, or one person can be the main speaker but taking questions from others. One way to capture these scenarios is that every time a speaker starts talking, the system 100 checks to see who has talked within a certain time. By default, the camera 103 that is the best choice for the new speaker will be chosen because he or she will be the one speaking and it is most important to see his or her motions. An appropriate zoom is chosen based on an evaluation of recent speakers in the source map, specifically determining the leftmost and rightmost past speakers in relation to the chosen camera.

In some implementations, if a speaker talks for more than a certain length of time, and no other person has spoken during that period, the system 100 resets the scene and focuses on the sole speaker.

Figure 11:
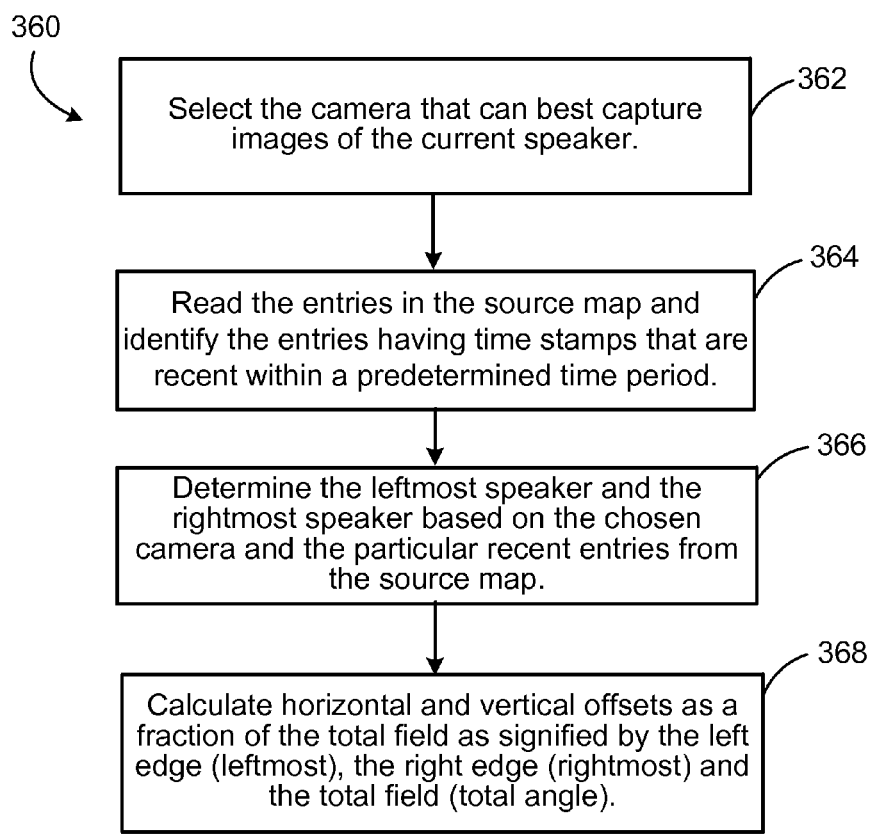
FIG. 11 is a flow diagram of a conversation sensitive zoom process.

Referring to FIG. 11, a conversation sensitive zoom process 360 is used to select a camera 103 and control the viewing angle and zoom factor of the selected camera 103 to ensure that the leftmost and rightmost active speakers are included in the images displayed. The conversation sensitive zoom process 360 includes the following steps:

Step 1 (362): Select the camera that can best capture images of the current speaker.

Step 2 (364): Read the entries in the source map 340 (e.g., by calling the SourceMapEntry) and identify the entries having time stamps that are recent within a predetermined time period.

Step 3 (366): Determine the leftmost speaker and the rightmost speaker based on the chosen camera and the particular recent entries from the source map 340.

Step 4 (368): Calculate horizontal and vertical offsets as a fraction of the total field as signified by the left edge (leftmost), the right edge (rightmost) and the total field (total angle).

Figure 12:
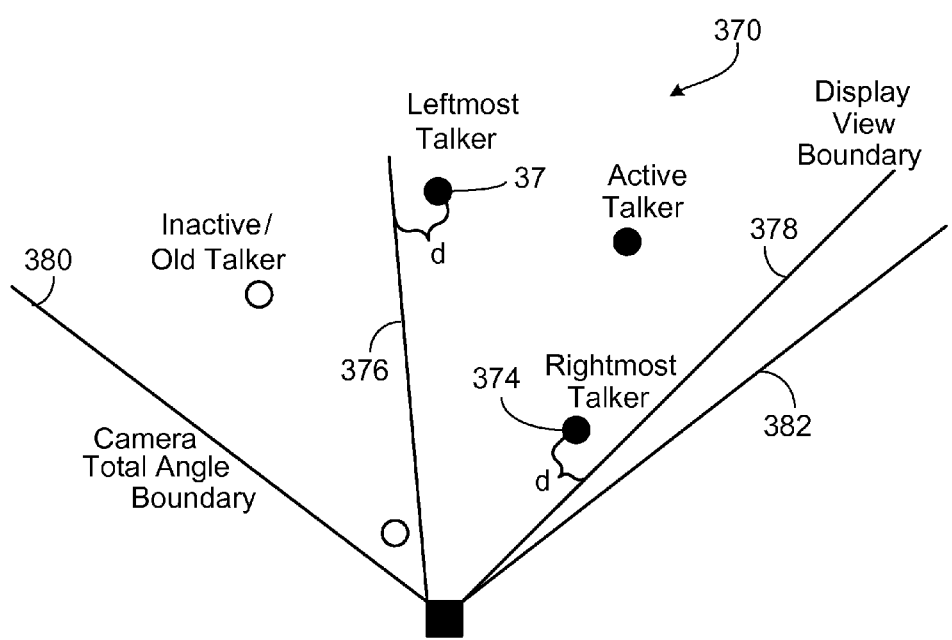
FIG. 12 is a diagram showing positions of active and inactive speakers and the left and right display boundaries.

FIG. 12 is a diagram 370 showing an example of positions of active and inactive speakers, and the left and right display boundaries. A margin of a few degrees d of viewing angle is provided on the left side 376 and right side 378 of the display view boundary in order to show the torsos of the leftmost speaker 372 and the rightmost speaker 374. Note that the speaker location identifier 112 determines the source of sound, which is the location of the speaker's mouth, so some margin at the left and right of the image is used to ensure that the entire torsos of the speakers are shown. The left and right side display view boundaries 376 and 378 are within the camera view angle left boundary 380 and camera view angle right boundary 382.

Figure 13:
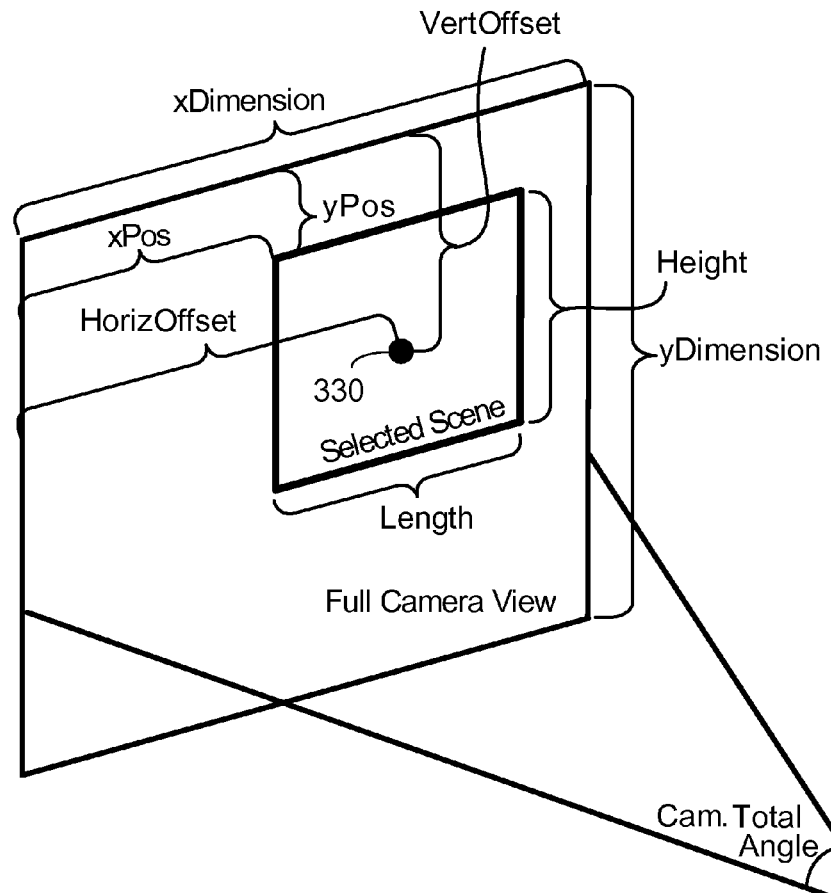
FIG. 13 shows a diagram for determining a horizontal position (xPos) and a vertical position (yPos) of a selected scene to achieve a particular digital zoom effect.

FIG. 13 shows a diagram for determining a horizontal position (xPos) and a vertical position (yPos) of a selected scene to achieve a particular digital zoom effect. In step 1, the system 100 sets up desired dimensions (xDimension and yDimension) for the zoomed angle using the equations:

$$xDimension = \frac{1024}{Length} \text{ and}$$

$$yDimension = \frac{768}{Hight}.$$

The equations above assumes that the display screen has a 1024×768 pixel resolution.

In step 2, the system 100 re-centers the window by calculating the horizontal and vertical position offsets xPos and yPos based on zoom size using the equations:

$$xPos = \frac{xDimension - 1024}{-2.0} \text{ and}$$

$$yPos = \frac{yDimension - 768}{-2.0}.$$

In step 3, the horizontal and vertical offsets are adjusted by using the equations:

$$xPos = \frac{xDimension - 1024}{-2.0} - (HorizOffset - .5) \cdot xDimension \text{ and}$$

$$yPos = \frac{yDimension - 768}{-2.0} - (VertOffset - .5) \cdot yDimension.$$

FIGS. 14A to FIG. 14D are examples of images of people talking in a room in which the images were taken by cameras in an experimental setup that implements the conversation sensitive zoom process 360 described above. In the experimental setup, a speaker location detector 112 was not used. Instead, a video of the people was analyzed to determine when someone starts speaking and the speaker ceases speaking, and entries were entered into a source map 340. The source map 340 was used to determine a talker map 350, which was used to control the selection of camera 103 and zooming of the images in the videos taken by the selected camera 103.

Figure 14A:
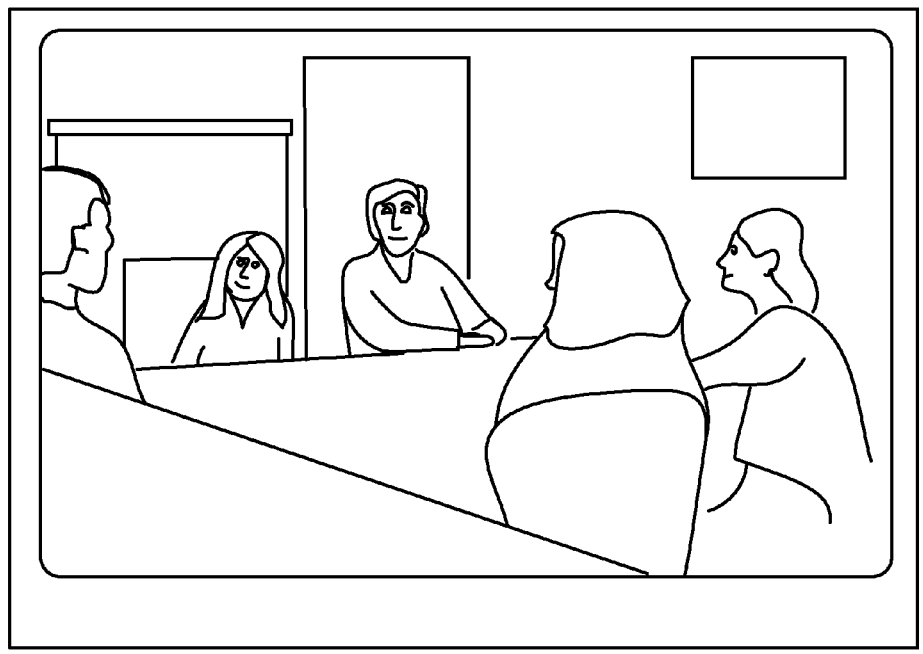
FIGS. 14A to FIG. 14D are images of people talking in a room.
Figure 14B:
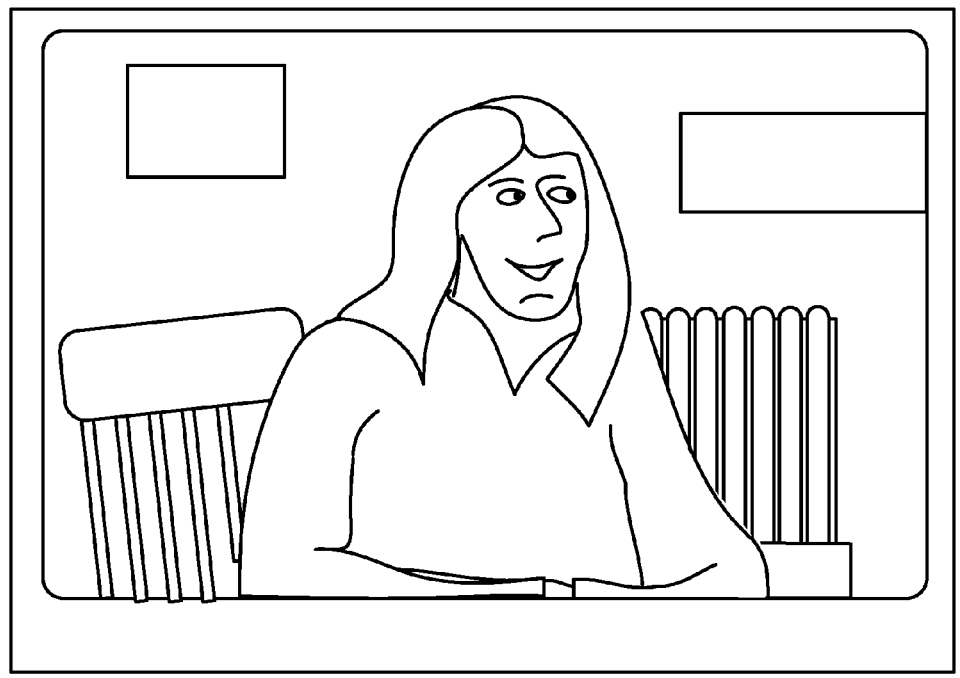
Figure 14C:
Figure 14D:
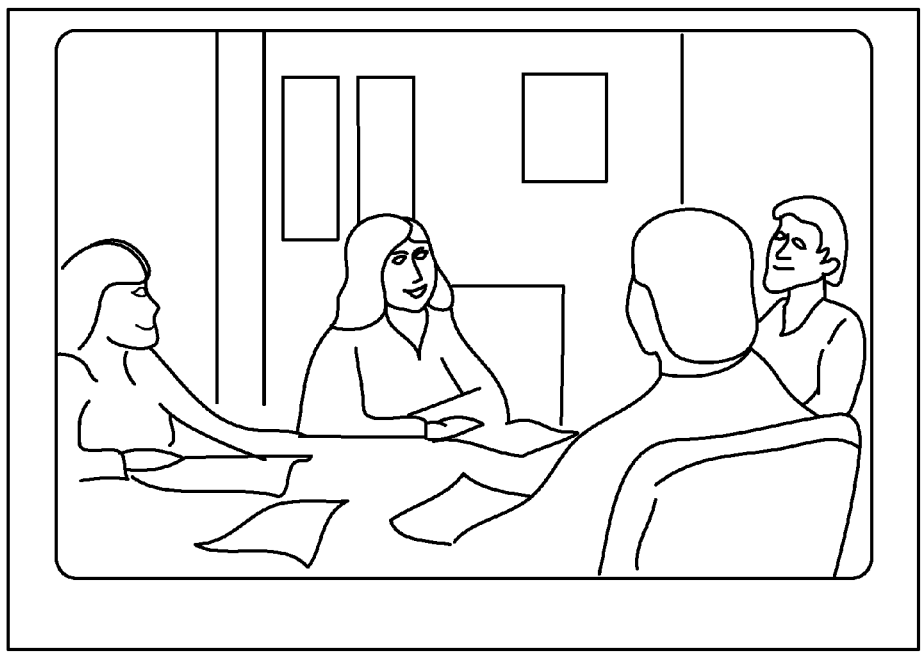

FIG. 14A shows an image taken by one of the cameras 103 with the widest view angle available (the least amount of zooming was used). FIG. 14B shows an image in which a single speaker was detected, and the image was zoomed in to the single speaker. FIG. 14C shows an image in which two persons are engaged in a conversation, and the image was zoomed in to show both speakers. FIG. 14D shows an image in which three people are engaged in a conversation. The image in FIG. 14D was taken by a camera to best capture the view of the speaker who is currently speaking.

The images shown in FIGS. 14B and 14C are somewhat grainy. The quality of the images can be improved by using video cameras having higher pixel resolutions. Alternatively, optical zoom can also be used to improve image quality.

Various modifications can be made to the system 100. In some examples, a delayed automatic zooming is used so that when a speaker ceases talking, the camera zoom does not change immediately. Rather, the scene changes after a few seconds to provide come sense of continuity to the viewer. This way, if a speaker pauses for a few seconds and resumes talking, the camera view angle will not change.

In some examples, the system 100 provides an advanced features section in the graphical user interface to allow users to configure the behavior of the system to suit their preferences. For example, the user can adjust the duration of time that the system 100 will consider a speaker to be "active" if the speaker has spoken within the duration of time, the zoom factors for various settings, the margins d at the left and right image borders, and the time delay between detection of changes in the talker map and adjustment of the display view.

In some examples, when the camera viewing angle or zoom factor are changed, there is a smooth transition from one scene to the next. The video appears to have continuous panning and zooming when speakers join in or drop out of a conversation. This prevents distracting quick flashes.

Other implementations and applications are also within the scope of the following claims. For example, the model numbers and parameters of the components in the video conferencing systems can be different from those described above. The video camera can be color or gray scale, it can include, e.g., a charge-coupled device (CCD) or a CMOS image sensor. The cameras 103 can be controlled using multiple embedded microcontrollers or a centralized computer. The system 100 can provide a GUI to allow users to adjust parameter values inside of text boxes. A self calibration system that used beeps from the cameras to calibrate the microphone array can be used. The camera viewing angle can be adjusted mechanically and optical zooming can be used.

More than one camera can be selected. For example, in a large conference room where speakers engaged in a discussion may be seated far apart, it may not be practical to show an image that includes all of the active participants of the discussion. Two or more cameras can be selected to show clusters of active participants, and the images can be shown on multiple windows. For example, if a first group of two people at one end of a long conference table and a second group of three people at the other end of the long conference table were engaged in a discussion, a video showing the first group of two people can be shown in one window, and another video showing the second group of three people can be shown in another window.

What is claimed is:

1. A method of conducting a video conference, comprising:
    using at least one camera to capture images of people at a first location participating in a video conference;
    identifying one or more active speakers among the people at the location;
    automatically selecting one of the at least one camera based on a position or positions of the one or more active speakers;
    providing images from the selected camera to a person at a second location participating the video conference; and
    maintaining a database of one or more active speakers, adding a person who starts to speak to the database, and removing a person who has not spoken for a predetermined period of time from the database.

2. The method of claim 1, comprising optically or digitally zooming the images based on the one or more active speakers.

3. The method of claim 1 wherein identifying one or more active speakers comprises identifying people who have spoken within a predetermined period of time.

4. The method of claim 1, comprising providing a user interface to allow adjustment of the duration of the predetermined period of time.

5. A method comprising:
    using at least one camera to capture images of people at a location;
    identifying one or more active speakers at the location;
    automatically selecting one of at least one camera based on a position or positions of the one or more active speakers;
    providing images from the selected camera; and
    maintaining a database of one or more active speakers, adding a person who starts to speak to the database, and removing a person who has not spoken for a predetermined period of time from the database.

6. The method of claim 5 wherein identifying one or more active speakers comprises identifying people who have spoken within a predetermined period of time.

7. The method of claim 5, comprising periodically updating the database and automatically adjusting the selection of camera based on the updated database.

8. The method of claim 5 wherein maintaining the database of one or more active speakers comprises storing information about when each speaker starts and ends speaking.

9. The method of claim 6 wherein maintaining the database of one or more active speakers comprises storing information about a coordinate of each active speaker.

10. The method of claim 5 wherein selecting one of at least two cameras comprises selecting one of the cameras having a smallest view offset angle with respect to the one or more active speakers.

11. The method of claim 5, comprising sending the images to a remote party who is conducting a video conference with the people at the location.

12. The method of claim 5, comprising determining the position or positions of the one or more active speakers.

13. The method of claim 12 wherein determining positions of the active speakers comprises determining positions of the active speakers by triangulation.

14. The method of claim 13 wherein determining positions of the active speakers by triangulation comprises triangulation based on signals from a microphone array.

15. The method of claim 5, comprising automatically zooming the camera to more clearly show the one or more active speakers.

16. The method of claim 15 comprising determining a zoom value based on a distance or distances between the camera and the one or more active speakers.

17. The method of claim 16 wherein determining the zoom value comprises determining a zoom value to provide a first margin between a reference point of a left-most active speaker and a left border of the image, and a second margin between a reference point of a right-most active speaker and a right border of the image.

18. The method of claim 15 comprising determining a zoom value based on a distance between the camera and a closest of the one or more active speakers.

19. The method of claim 5, comprising automatically adjusting a viewing angle of the camera to more clearly show the one or more active speakers.

20. An apparatus comprising:
    at least one camera to capture images of people at a location;
    a data processor to select one of the at least one camera based on a position or positions of one or more active speakers at the location and provide images from the selected camera to show the one or more active speakers; and
    a storage to store coordinates of the active speakers in the room, and time points when each active speaker started and ended talking.

21. The apparatus of claim 20, comprising a speaker identifier to identify active speakers in the room.

22. The apparatus of claim 21 wherein the speaker identifier identifies active speakers in the room by identifying one or more people who have spoken within a predetermined period of time.

23. The apparatus of claim 21 wherein the speaker identifier comprises a microphone array that enables determination of positions of the active speakers by triangulation.

24. The apparatus of claim 20 wherein the data processor selects one of the at least one camera by selecting the camera having a smallest view offset angle with respect to the active speakers.

25. The apparatus of claim 20 wherein the data processor executes a video conferencing process to send the image to a remote party who is video conferencing with the people at the location.

26. The apparatus of claim 20 wherein the data processor controls a zoom factor and a viewing direction of the camera such that the active speakers are within a viewing range of the camera.

27. A method comprising:
using at least one camera to capture images of people at a location;
identifying one or more active speakers at the location;
automatically selecting one of at least one camera based on a position or positions of the one or more active speakers; and
providing images from the selected camera;
wherein selecting one of at least one camera comprises selecting a camera having a smallest view offset angle with respect to the one or more active speakers.

28. A method comprising:
using at least one camera to capture images of people at a location;
identifying one or more active speakers at the location;
automatically selecting one of at least one camera based on a position or positions of the one or more active speakers;
providing images from the selected camera;
automatically zooming the camera to more clearly show the one or more active speakers; and
determining a zoom value based on a distance or distances between the camera and the one or more active speakers.

29. The method of claim 28 wherein determining the zoom value comprises determining a zoom value to provide a first margin between a reference point of a left-most active speaker and a left border of the image, and a second margin between a reference point of a right-most active speaker and a right border of the image.

30. A method comprising:
using at least one camera to capture images of people at a location;
identifying one or more active speakers at the location;
automatically selecting one of at least one camera based on a position or positions of the one or more active speakers;
providing images from the selected camera;
automatically zooming the camera to more clearly show the one or more active speakers; and
determining a zoom value based on a distance between the camera and a closest of the one or more active speakers.

31. A method comprising:
using at least one camera to capture images of people at a location;
identifying one or more active speakers at the location;
automatically selecting one of at least one camera based on a position or positions of the one or more active speakers;
providing images from the selected camera; and
automatically adjusting a viewing angle of the camera to more clearly show the one or more active speakers.

32. An apparatus comprising:
at least one camera to capture images of people at a location; and
a data processor to select one of the at least one camera based on a position or positions of one or more active speakers at the location and provide images from the selected camera to show the one or more active speakers;
wherein the data processor selects one of the at least one camera by selecting the camera having a smallest view offset angle with respect to the active speakers.

33. The method of claim 27, comprising optically or digitally zooming the images based on the one or more active speakers.

34. The method of claim 33, comprising determining a zoom value based on a distance or distances between the camera and the one or more active speakers.

35. The method of claim 34 wherein determining the zoom value comprises determining a zoom value to provide a first margin between a reference point of a left-most active speaker and a left border of the image, and a second margin between a reference point of a right-most active speaker and a right border of the image.

36. The method of claim 34, comprising determining a zoom value based on a distance between the camera and a closest of the one or more active speakers.

37. The method of claim 27 wherein identifying one or more active speakers comprises identifying people who have spoken within a predetermined period of time.

38. The method of claim 27, comprising providing a user interface to allow adjustment of the duration of the predetermined period of time.

39. The method of claim 27, comprising sending the images to a remote party who is conducting a video conference with the people at the location.

40. The method of claim 27, comprising determining the position or positions of the one or more active speakers.

41. The method of claim 40 wherein determining positions of the active speakers comprises determining positions of the active speakers by triangulation.

42. The method of claim 41 wherein determining positions of the active speakers by triangulation comprises triangulation based on signals from a microphone array.

43. The method of claim 27, comprising automatically adjusting a viewing angle of the camera to more clearly show the one or more active speakers.

44. The method of claim 28, comprising determining the zoom value based on a distance between the camera and a closest of the one or more active speakers.

45. The method of claim 28 wherein identifying one or more active speakers comprises identifying people who have spoken within a predetermined period of time.

46. The method of claim 45, comprising providing a user interface to allow adjustment of the duration of the predetermined period of time.

47. The method of claim 28, comprising sending the images to a remote party who is conducting a video conference with the people at the location.

48. The method of claim 28, comprising determining the position or positions of the one or more active speakers.

49. The method of claim 48 wherein determining positions of the active speakers comprises determining positions of the active speakers by triangulation.

50. The method of claim 49 wherein determining positions of the active speakers by triangulation comprises triangulation based on signals from a microphone array.

51. The method of claim 28, comprising automatically adjusting a viewing angle of the camera to more clearly show the one or more active speakers.

52. The method of claim 30, wherein determining the zoom value comprises determining a zoom value to provide a first margin between a reference point of a left-most active speaker and a left border of the image, and a second margin between a reference point of a right-most active speaker and a right border of the image.

53. The method of claim 30 wherein identifying one or more active speakers comprises identifying people who have spoken within a predetermined period of time.

54. The method of claim 30, comprising providing a user interface to allow adjustment of the duration of the predetermined period of time.

55. The method of claim 30, comprising sending the images to a remote party who is conducting a video conference with the people at the location.

56. The method of claim 30, comprising determining the position or positions of the one or more active speakers.

57. The method of claim 56 wherein determining positions of the active speakers comprises determining positions of the active speakers by triangulation.

58. The method of claim 57 wherein determining positions of the active speakers by triangulation comprises triangulation based on signals from a microphone array.

59. The method of claim 30, comprising automatically adjusting a viewing angle of the camera to more clearly show the one or more active speakers.

60. The method of claim 31, comprising optically or digitally zooming the images based on the one or more active speakers.

61. The method of claim 60, comprising determining a zoom value based on a distance or distances between the camera and the one or more active speakers.

62. The method of claim 61 wherein determining the zoom value comprises determining a zoom value to provide a first margin between a reference point of a left-most active speaker and a left border of the image, and a second margin between a reference point of a right-most active speaker and a right border of the image.

63. The method of claim 60, comprising determining a zoom value based on a distance between the camera and a closest of the one or more active speakers.

64. The method of claim 31 wherein identifying one or more active speakers comprises identifying people who have spoken within a predetermined period of time.

65. The method of claim 31, comprising providing a user interface to allow adjustment of the duration of the predetermined period of time.

66. The method of claim 31, comprising sending the images to a remote party who is conducting a video conference with the people at the location.

67. The method of claim 31, comprising determining the position or positions of the one or more active speakers.

68. The method of claim 67 wherein determining positions of the active speakers comprises determining positions of the active speakers by triangulation.

69. The method of claim 68 wherein determining positions of the active speakers by triangulation comprises triangulation based on signals from a microphone array.

70. The apparatus of claim 32, comprising a speaker identifier to identify active speakers in the room.

71. The apparatus of claim 70 wherein the speaker identifier identifies active speakers in the room by identifying one or more people who have spoken within a predetermined period of time.

72. The apparatus of claim 70 wherein the speaker identifier comprises a microphone array that enables determination of positions of the active speakers by triangulation.

73. The apparatus of claim 32 wherein the data processor executes a video conferencing process to send the image to a remote party who is video conferencing with the people at the location.

74. The apparatus of claim 32 wherein the data processor controls a zoom factor and a viewing direction of the camera such that the active speakers are within a viewing range of the camera.

* * * * *